(12) United States Patent
Piagentini et al.

(10) Patent No.: US 11,914,463 B2
(45) Date of Patent: Feb. 27, 2024

(54) AUTOMATIC SUPPORT SERVICE

(71) Applicant: Salesforce, Inc., San Francisco, CA (US)

(72) Inventors: Federico Ariel Piagentini, Buenos Aires (AR); Santiago Vacas, Buenos Aires (AR); Tomás Christian Fox, San Miguel (AR); Ashley Carrington Simons, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 125 days.

(21) Appl. No.: 17/465,483

(22) Filed: Sep. 2, 2021

(65) Prior Publication Data

US 2023/0065188 A1 Mar. 2, 2023

(51) Int. Cl.
| | |
|---|---|
| *G06F 11/00* | (2006.01) |
| *G06F 11/07* | (2006.01) |
| *G06N 5/02* | (2023.01) |
| *G06F 11/32* | (2006.01) |
| *H04L 41/5074* | (2022.01) |
| *G06F 11/22* | (2006.01) |
| *H04L 41/5061* | (2022.01) |

(52) U.S. Cl.
CPC ...... *G06F 11/0784* (2013.01); *G06F 11/0769* (2013.01); *G06F 11/0787* (2013.01); *G06F 11/2252* (2013.01); *G06F 11/321* (2013.01); *G06F 11/327* (2013.01); *G06N 5/02* (2013.01); *H04L 41/5074* (2013.01); *H04L 41/5061* (2013.01)

(58) Field of Classification Search
CPC ............ G06F 11/0784; G06F 11/0769; G06F 11/321; G06F 11/327; G06F 9/451; G06F 9/453; H04L 41/5074; G06Q 30/015; G06Q 30/016
See application file for complete search history.

(56) References Cited

U.S. PATENT DOCUMENTS

| | | | |
|---|---|---|---|
| 6,032,184 A * | 2/2000 | Cogger | H04L 63/0464 |
| | | | 707/E17.107 |
| 6,629,267 B1 * | 9/2003 | Glerum | G06F 11/0787 |
| | | | 714/38.11 |

(Continued)

OTHER PUBLICATIONS

GitGub, Inc., "axios-har-tracker," v0.1.2, node package manager (npm), Jan. 2021, downloaded from https://www.hpmjs.com/package/axios-har-tracker on Aug. 17, 2021, 5 pages.

(Continued)

*Primary Examiner* — Marc Duncan
(74) *Attorney, Agent, or Firm* — Nicholson, De Vos, Webster & Elliott, LLP

(57) ABSTRACT

A method of an automatic support service that includes receiving a request for additional assistance for an error from a user interface, retrieving error information from a logging system for the error, generating an error information collection interface, in response to the request, populating the error information collection interface with the error information from the logging system, sending the error information collection interface to be displayed to the user by the user interface, and receiving additional error information from the user via the error information collection interface.

21 Claims, 11 Drawing Sheets

(56) References Cited

U.S. PATENT DOCUMENTS

| | | | |
|---|---|---|---|
| 7,730,478 | B2 | 6/2010 | Weissman |
| 9,710,122 | B1* | 7/2017 | Pillay ..................... H04L 41/12 |
| 10,540,223 | B1* | 1/2020 | Johansson ........... G06F 11/0775 |
| 10,817,362 | B1* | 10/2020 | Bruckner ............ G06F 11/0778 |
| 10,963,371 | B1 | 3/2021 | De Sousa Bispo et al. |
| 11,416,318 | B1 | 8/2022 | Kraan Brun et al. |
| 2005/0081108 | A1* | 4/2005 | Shabalin ............... G06F 11/263 714/38.11 |
| 2008/0320343 | A1* | 12/2008 | Eickmeyer .......... G06F 11/0709 714/57 |
| 2018/0218374 | A1* | 8/2018 | Shah ................... G06Q 30/016 |
| 2021/0303446 | A1* | 9/2021 | Sukhyani ............ G06F 11/3692 |
| 2021/0311918 | A1* | 10/2021 | Cheng ................. G06F 11/3636 |
| 2022/0291977 | A1 | 9/2022 | Piagentini et al. |
| 2023/0066698 | A1 | 3/2023 | Piagentini et al. |

OTHER PUBLICATIONS

Netflix, Inc., "Polly.js Overview," copyright 2018, downloaded from https://netflix.github.io/pollyjs/#/README on Aug. 17, 2021, 8 pages.

Sumo Logic, "APIs," last updated Oct. 22, 2020, downloaded from https://help.sumologic.com/APIs on Sep. 1, 2021, 4 pages.

* cited by examiner

AUTOMATIC SUPPORT SERVICE

TECHNICAL FIELD

One or more implementations relate to the field of application support services; and more specifically, to processes and systems for automating the collection and submission of error information for applications and services such as applications and services offered in multi-tenant systems.

BACKGROUND ART

Users can often encounter various types of errors while using applications or services. Similarly, developers on platforms supported by third parties can also encounter errors in developing or customizing applications and services for the platform. The notifications provided by these errors can be cryptic and uninformative. The users or developers are forced to research the error and search for resources to understand and resolve the error. This process is time consuming and frustrating for the user and developers.

The user or developer in some cases can reach out to support staff for the developer of the application or platform in which the error occurred. However, conveying accurate information about the error that can be utilized by the support staff is a manual task of describing the error and collecting and sending additional information to the support staff. The user or developer can have limited access to relevant information about the error such as logs and similar information about the error. The support staff can have a difficult time locating such relevant information due to the limited information provided by the user or developer. These interactions are time consuming requiring many iterations and generally unsatisfactory experiences for the use of the application, service, or platform in question.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1:
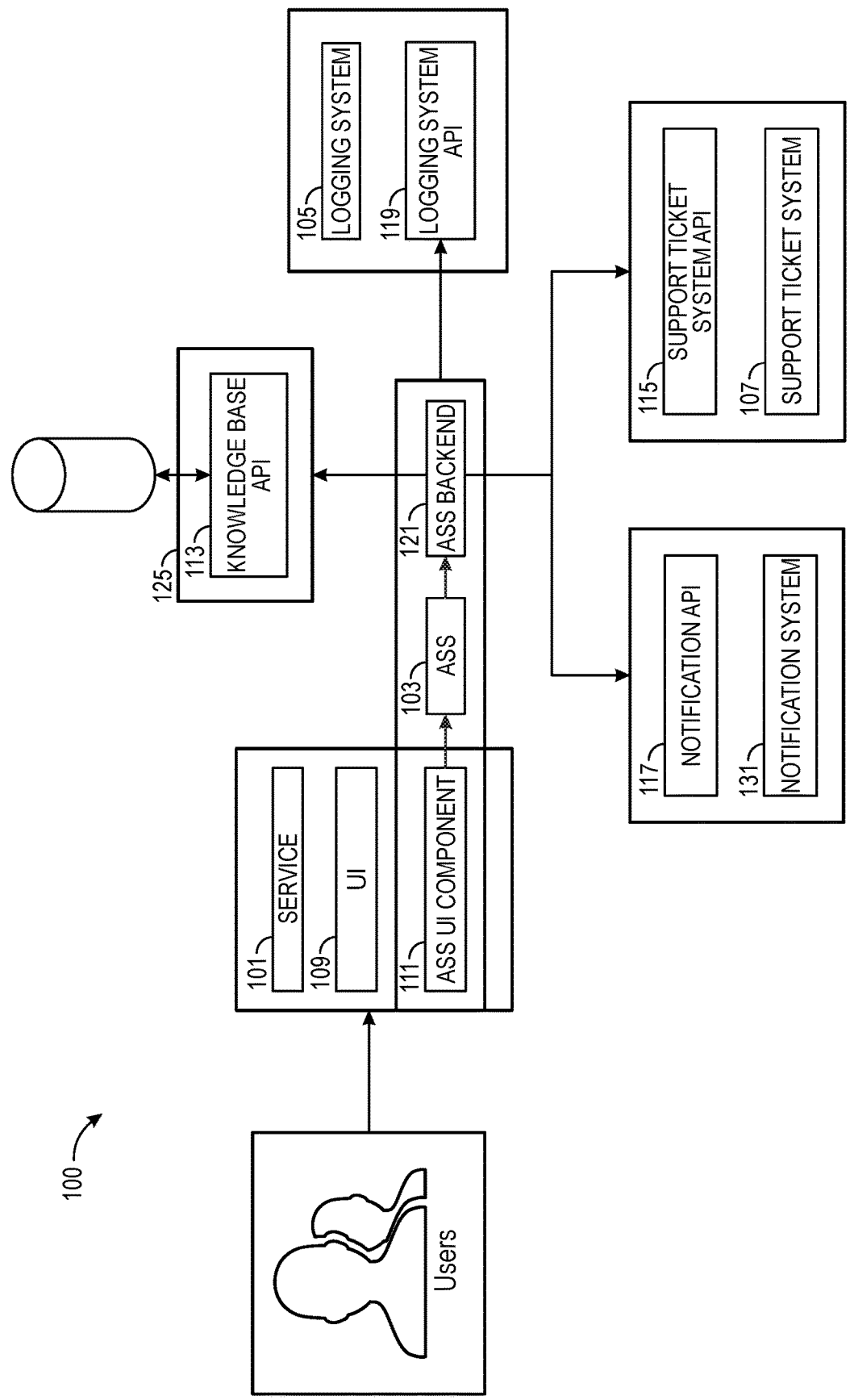
FIG. 1 is a diagram of one embodiment of a system supporting an automatic support service (ASS).

The following description describes implementations for an automated support service. The automated support service assists a user to find information about errors encountered in an application or service, as well as, to generate a 'ticket' when the available information is insufficient to resolve the encountered error. A 'ticket' as used herein is a request with a problem encountered in an application or service that is submitted by a user to a support team for the application or service. The automated support service generates a ticket upon request of the user that encountered the problem with the application or service. The automated support service gathers information related to the problem and pre-populates the ticket with the gathered information or attached relevant information to the ticket that will facilitate the support team in servicing the ticket. The user can complete the ticket and submit the ticket to the support team along with the collected and pre-populated error information. The automated support service can also send notifications to the support team upon initial request for information about the error as well as upon submission of the ticket.

The embodiments manage a case where a user faces an error in the use of an application or service. The error can be based on any number of underlying causes. A 'user,' as used herein can be any type of user of an application or service, including a basic user, a developer, administrator, or similar user. A user can be utilizing, developing, configuring, or otherwise interacting with any type or variety of software based application or service. For sake of clarity and conciseness the embodiment herein may be described primarily in relation to a use of a service. A 'service,' as used herein can refer to any software function or process that can be application based, web-based, or similarly structured. The user can be interacting with the service in any capacity or using any of its functionality when an error is triggered. The error can be a failure in the backend of the service, an error in the user interface (UI) of the service, an error with a third-party dependency, an error in an application programming interface (API), an error in the underlying platform, or any number of other types of errors in the service or in software that the service is dependent upon or interacts with.

These errors however can generate various error codes or feedback that is not readily intelligible to the user. The embodiments provide a process and system that facilitate a support team for the service in cases where the support team needs to explain to the user the conditions for the error despite the complexity of the system where a failure changes over time. The embodiments work in complex software ecosystems where new API versions are introduced, related services go down, new features introduced, and business rules change. Whatever error the user faces, they will go and create a ticket or similar type of request for support escalation, which may be avoidable given proper information. The ticket will reach the support team who will be in need of as much information as possible to diagnose and resolve the error. The automated support service collects this information such as the automated collection and attachment of a hypertext transfer protocol (HTTP) archive (HAR) file for the user and support team to reduce the number of iterations of questions and answers between the user and the support team needed discover the root cause and give a solution to the user. This improves user experience and reduces the man hours of the support team to resolve tickets.

The embodiments address the problems of the art including reducing the frequency of support ticket generation by users where they are facing a known issue even if it is a very new issue. The embodiments also reduce the effort for the user to generate the support ticket as well as improve the information collection for the support ticket. If the user needs to create a support ticket, the embodiments autopopulate as much as possible of the support ticket so that the support team has as much information and in particular key types of information needed to resolve the issue. The embodiments notify the support team automatically if, given a solution for a specific problem, the user creates a support ticket or similar support escalation. An initial notification can be generated prior to support ticket submission so that the documentation and knowledgebase articles related to the issue can be updated for the next user.

The embodiments combine a set of functions to provide value and create an automatic support service that can be easily integrated into any UI. The embodiments include the automatically sending details from an error request into a backend service, using the error request (e.g., incorporating a TraceID), integration with a logging system (e.g., Sumologic by Sumo Logic, Inc.), extracting a full stack trace at the UI, backend, or other aspect of the service using stack tracing functions. In some embodiments, the automated support service provides integration with a knowledge base to get the best response based on the extracted error notifications provided in the UI. A 'knowledge base,' as used herein is a curated collection of problem solving articles and information that can be indexed or correlated with error types for the service. The relevant knowledge articles that may help a user without generating a support ticket can be retrieved and presented to the user by the automated support service. If the retrieved knowledgebase articles are insufficient to enable the user to resolve the encountered error, then the automated support service can extraction a HAR or similar files containing local error information at the UI, backend, or similar locations in the service. A HAR file can be retrieved using a function such as Polly.js by Netflix, AxiosHAR tracker, or similar functions to pre-populate a support ticket creation interface (e.g., attaching the HAR and extracting relevant data from the UI or a stack trace). The user then needs only to review the data and optionally add further information (e.g., details from the user account or error information collection that are missing) and click 'Submit.'

The embodiments provide advantages over the art that include an automatically updated hands-off support service that can be plug-and-play in existing UIs (e.g., in applications and services of a multi-tenant platform including Salesforce). The embodiments provide further advantages including automatic error parsing, automated knowledge base querying, automated HAR extraction, error information parsing to create a one-click action for the customer to provide all required data to the support staff.

FIG. 1 is a diagram of one embodiment of a system supporting an automatic support service. The diagram illustrates an architecture 100 that supports an automated support service (ASS) 10. The relevant components of the architecture 100 are illustrated that interact with the automated support service 103. For sake of clarity and conciseness other components and underlying architecture including hardware, operating systems, other middleware, and similar components are not illustrated. An example operating context of a multi-tenant architecture is described further herein below with relation to FIGS. 9A and 9B.

Returning to the architecture of FIG. 1, in some embodiments, the architecture 100 includes a service 101, automated support service 103, knowledge base 125, logging system 105, support ticket system 107, notification system 131 and similar components. The service 101 can be any type of application or service utilized, designed, configured, or similarly interacted with by a user (e.g., a developer, end user, administrator, or similar user). The service 101 can be hosted on any type of platform or architecture 100. The service 100 can provide any range of functions, data, and operations. The service can interface with or interact with the automated support system 103. The automated support system 103 can interface with the knowledge base 125, logging system 105, notification system 131, and support system 107 to facilitate the handling and servicing of errors by the user and the support team.

The service 101 can include a user interface (UI) 109 through which the user interacts with the service 101, which can be a command line interface (CLI), graphical interface or similar user interface. The service 101 can include automated support system UI component 111 or similar embedded component.

The automated support system UI component 111 can be included in or work in conjunction with any service 101 UI. The automated support system UI component 111 can provide an analysis on errors detected on any request, searches, or results in the service 101 UI 109 automatically. The service 101 UI 109 can be any type of UI. The automated support system UI component 109 can be integrated within, embedded, or in communication with the UI 109 to parse any generated errors and provide integration with the knowledge base 125, logging system 105, notification system 131, support ticket system 107, and similar components via the automated support system backend 121.

In some embodiments, the automated support system UI component 111 can be a small piece of (e.g., Javascript) code that is included in the service 101 to allow the parsing of the requests in the service and communication with the automated support service backend 121. Where the service 101 is a web-based service, the code of the automated support system UI component 111 can be code added to the web pages or similar aspects of the service 101. In a web based example, when a 50x request is detected, the automated support service UI component 111 makes a request to the backend 121 with the details of the failed request so that the dynamic analysis of the error can begin. This component 111 also handles the UI presented to the user including presentation of retrieved knowledge base articles, and the interface or forms used to create a support ticket.

The automated support service backend 121 provides integration with all the other relevance components of the platform. The automated support service backend 121 can generate requests or calls to the other component using and/or implementing their respective APIs. The automated support service backend 121 can thereby request knowledge based articles via a knowledge base API 113, logged error information via logging system API 119, generated and submit support tickets via a support ticket system API 115, and notifications can be sent to support team members via a notifications API 117.

The knowledge base 125 can be any database management system or data storage with articles for know errors and issues related to at least the service 101. The knowledge base 125 can be accessed via functions of the knowledge base API 113. The articles of the knowledge base can have any size, format, or structure. The articles can be stored in any type of database such as a relational database, object oriented database, or similar databases or structures. The knowledge base API 113 enables queries for the knowledge base 125 to identify and retrieve knowledge based articles. The knowledge base API 113 can provide support for structured queries, full text searches, and similar interactions and mechanisms for identifying and retrieving the relevant articles from the database or data structure of the knowledge base system 125.

The logging system 105 can be any sort of error tracking, system status recording, change log, or similar function and storage for monitoring the operations of the service 101 and related systems in the platform 100. The logging system 105 and associated stored logs for the service 101 can be accessed by using the logging system API 119. The logging system API 119 can be used to integrate the logging system 125 with the automated support system backend 121 to extract full details of a detected error or similar issue. In one example embodiment, the logging system 125 and or logging system API can be based on Sumo Logic.

The support ticket system 107 can be any support ticket tracking and servicing system that is utilized by a support team to receive, track, resolve, monitor, or similarly administer tickets that are submitted by service 101 or platform 100 users that encounter issues, errors, or problems that they are not able to resolve. Tickets can be submitted and/or generated by the automated support system backend 121 by use of the support ticket system API 115. If the user decides to create a support ticket, the automated support service 103 will extract as much information as possible automatically including details of the error, the full stackTrace for the service or relevant components of the service as extracted from the Logging System 105 using the logging system API 119, and a local error file from the service 101 such as a HAR file for a full context from the UI 109 and service 101. This collected information is used by the automated support service backend 121 to pre-populate a new support tick for the user so the user can review and submit with minimal additional work in most cases.

The notification system 131 can be any type of messaging service or application. The notification system 131 can utilize any protocol to communicate information between users of the platform 101. The protocols can include simple messaging service (SMS), email, Slack, or similar messaging services and protocols. The automated support service 103 can initiate notifications using the notifications API 117. The automated support service can 103 can be integrated with the notification system 131 to immediately notify the support team of knowledge base queries, that the knowledge base results were insufficient, or in response to a user request for additional assistance.

Figure 2:
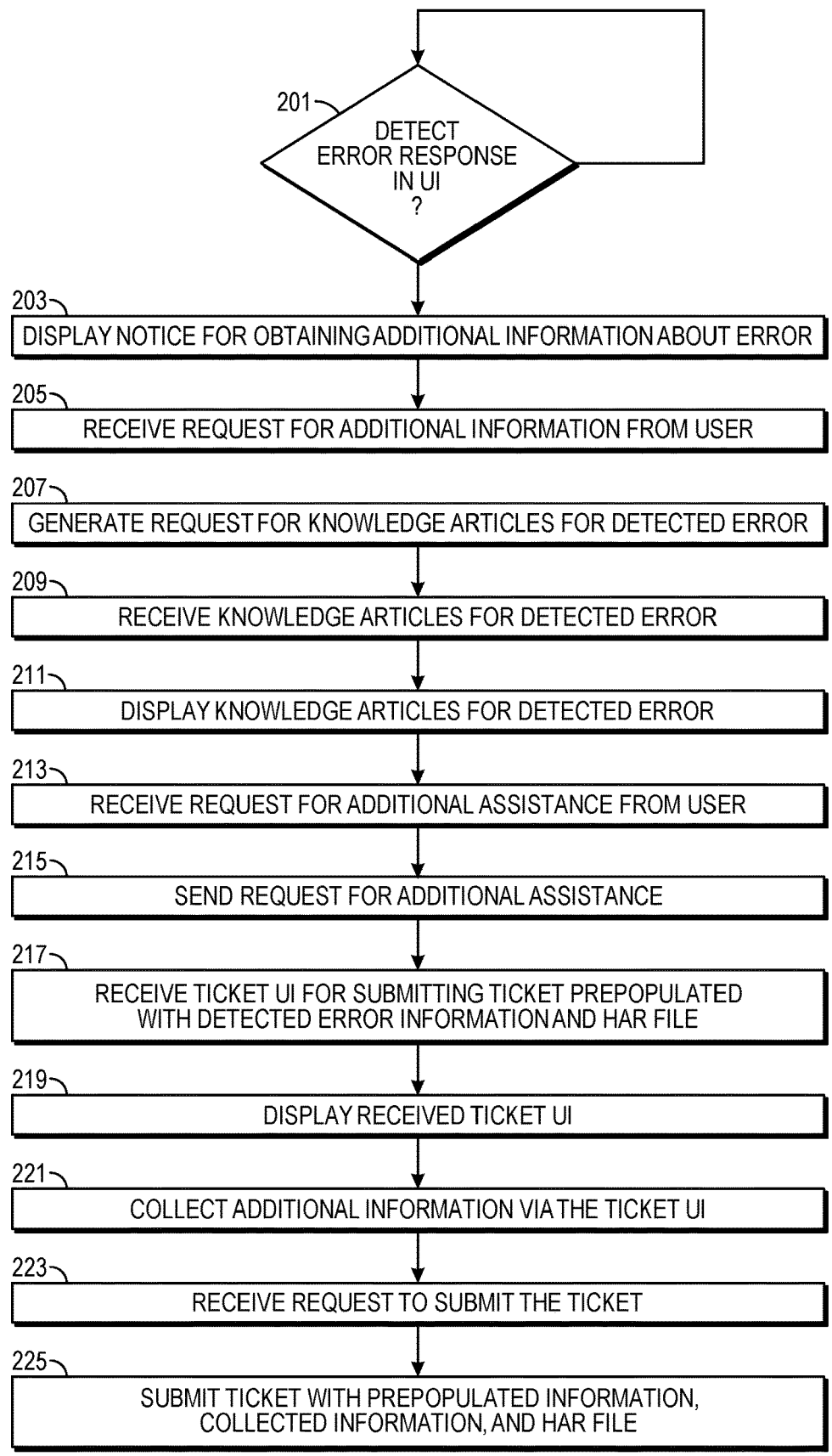
FIG. 2 is a flowchart of one embodiment of a process of an automatic support service user interface component.

FIG. 2 is a flowchart of one embodiment of a process of an automated support service user interface component. The automated support service user interface component can continuously monitor the updates of the UI interface of the target service for error notifications, be triggered by calls from the service in response to errors, or similarly detect error responses in the UI of the service (Block 201). In response to detecting the error in the UI of the service or similarly being called by the service in response to an error, the automated support service UI component can display a notice that additional information can be made available where the notice is shown via the UI of the service or via a similar mechanism. An example of the notification is shown in FIG. 4.

Figure 4:
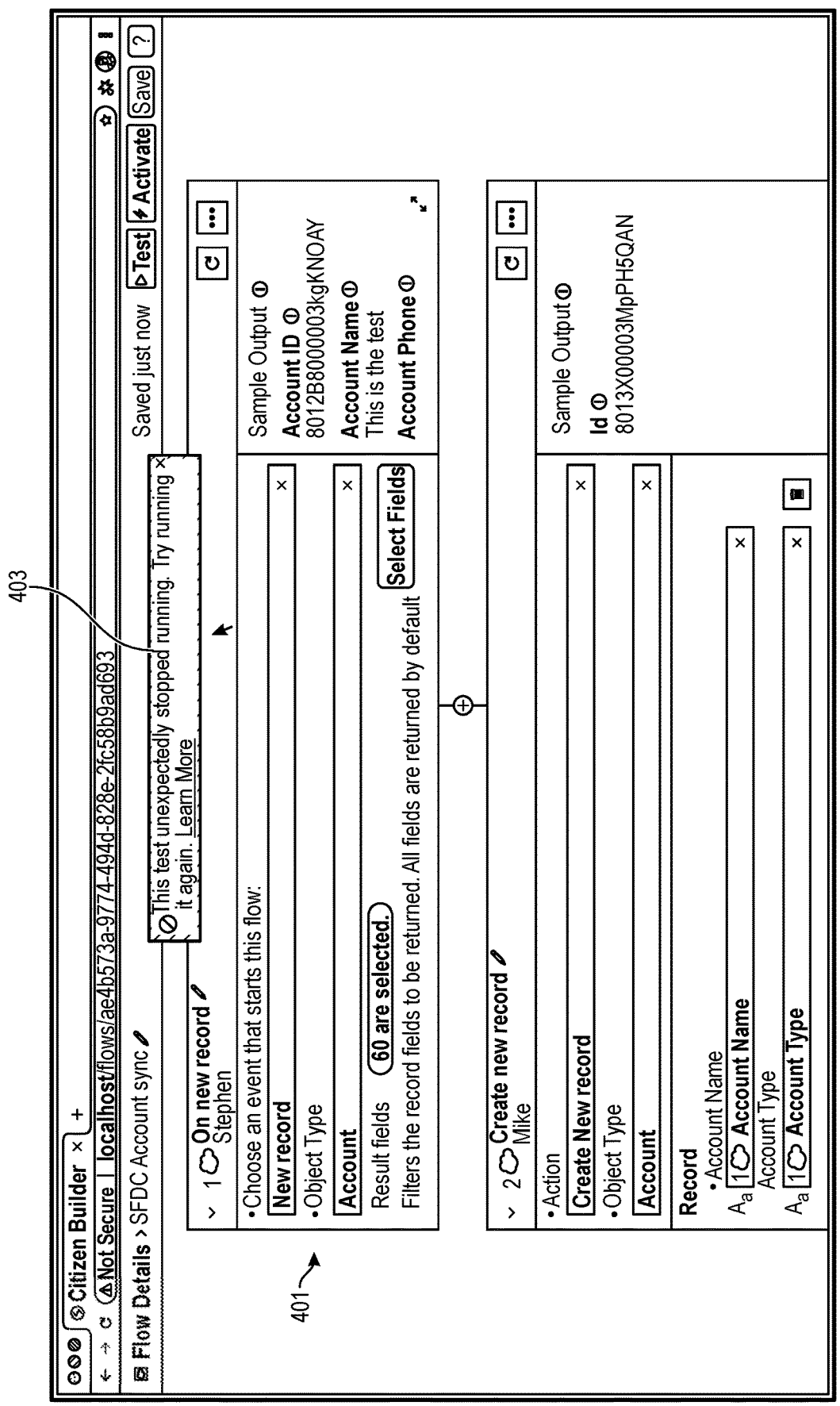
FIG. 4 is a diagram of one embodiment of the user interface for an error notification to a user.

FIG. 4 is a diagram of one embodiment of the user interface for an error notification to a user. A user interface 401 of an example service (i.e., Composer from MuleSoft, LLC). The user has encountered an error in the use of the service where a test has stopped running. A notice 403 is generated by the automated support service UI component and displayed over the service UI. In this example, a response from the backend of the service provides an error to the UI of the service, which is parsed by the support service UI component and triggers the display of notification 403. The support service UI component can be hard coded with knowledge of basic types of errors generated by service or can request information about detected errors from the automated support service backend in response to parsing the error received at the UI of the service. The notification 403 can include an option to enable a user to request additional information about the error or problem that has been detected. In the illustrated example, a link labeled 'learn more' is included and can be utilized to activate the support service UI component, which will initiate a knowledge base query.

Returning to FIG. 2, the request for additional information is received from the user by the support service UI component via the notification or similar user interface element (Block 205). The support service UI component can then generate a request for articles from the knowledge base for the error that has been detected (Block 207). The request can include any detected error identifier, a request identifier, tracking identifier, or similar information that can be utilized by the support service backend to retrieve relevant articles from the knowledge base.

Figure 3:
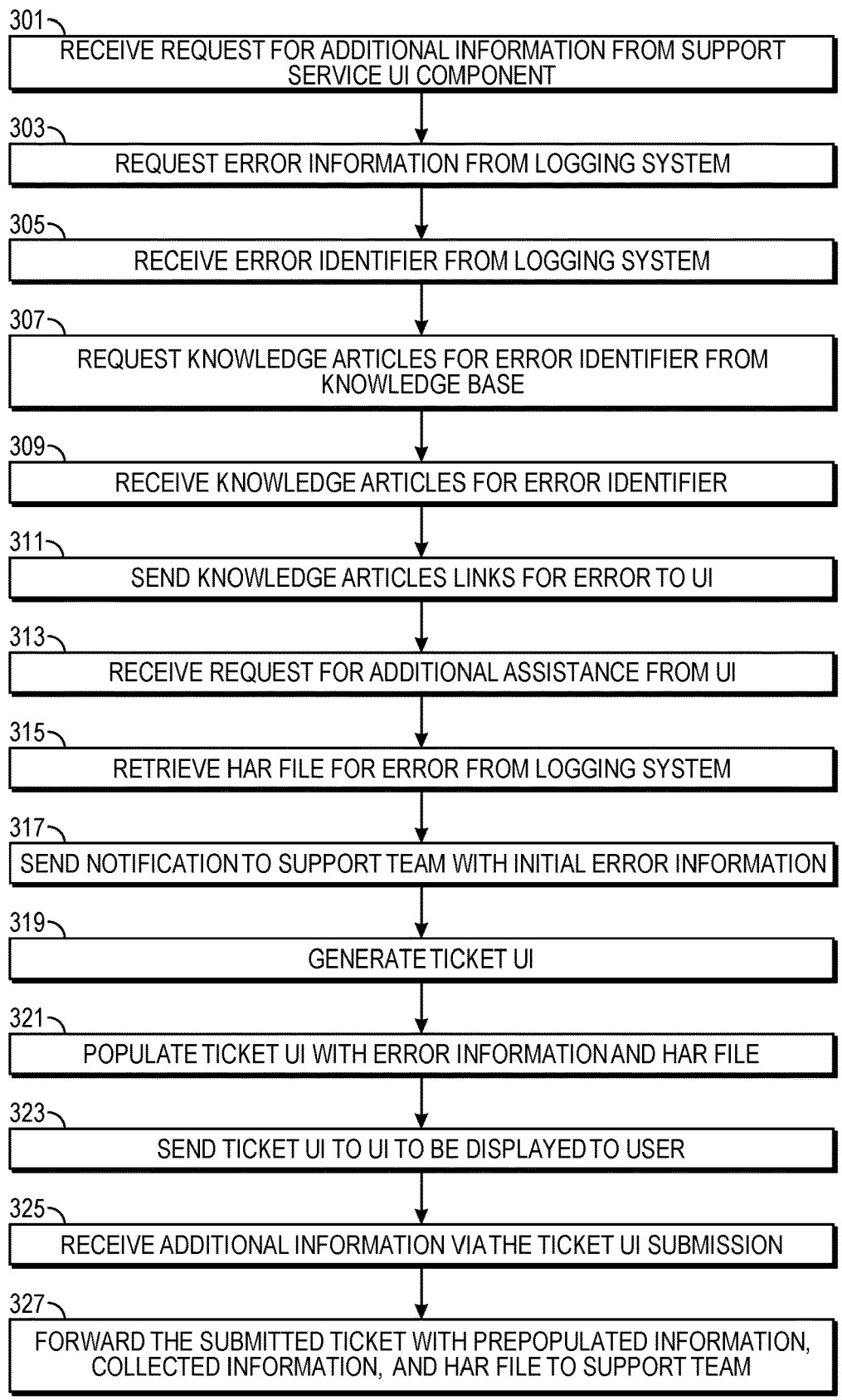
FIG. 3 is a flowchart of one embodiment of a process of an automatic support service backend component.

FIG. 3 is a flowchart of one embodiment of a process of an automated support service backend component. The support service UI backend receives the request for the additional information from support service UI component (Block 301). In some embodiments, the support service UI backend utilizes the logging system UI to obtain error information depending on the type of error. The received request can contain error identifying information. The error identifying information can be matched or utilized to query the logging system (Block 303) for additional error information to give more detail about the error that has been reported to the user. The logging system can return additional information and, in some cases, a more precise error identifier (Block 305). When the error identifier is received or other additional error information, then the automated support system backend can use the error identifier and any other additional error information to generate a query for relevant knowledge articles from the knowledge base (Block 307). The results of the query or similar request via the knowledge base API are returned to the automated support service backend (Block 309).

The automated support service backend can then generate an interface or similarly package the results to be sent to the automated support service UI component. In some embodiments, the knowledge base results are prepared as a webpage or similar display of the knowledge base articles. The interface or packaging of the results is then sent to the automated support service UI component to be displayed to the user (Block 311).

Returning to FIG. 2, the automated support system UI component receives the packaged or formatted knowledge base articles from the automated support system backend (Block 209). The received knowledge base articles can then be displayed to the user. In some embodiments, a number or listing of articles found is initially displayed and the user can select the articles to look at in detail.

Figure 5:
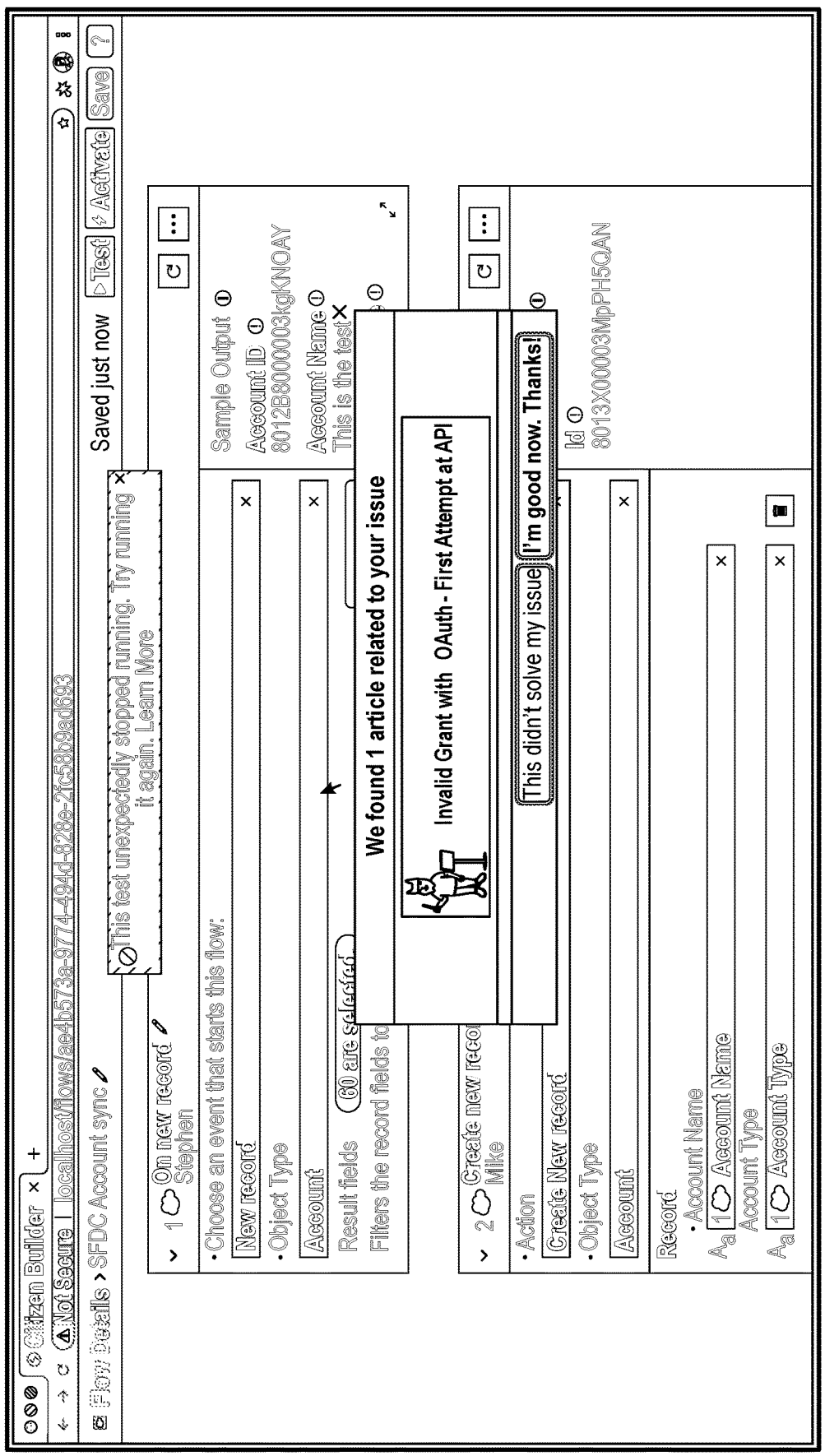
FIG. 5 is a diagram of one embodiment of the user interface for a knowledge base notification for the user.

FIG. 5 is a diagram of one embodiment of the user interface for a knowledge base notification for the user. In this example, a single knowledge base article was found in the search and the option to display the full details of the article is provided. In addition, the user is requested to confirm that the knowledge base articles enabled the user to solve the problem or error encountered or to select an input to indicate that further assistance is needed because the knowledge base articles did not enable the user to resolve the problem or error. In further embodiments, additional feedback or commentary can be provided through the interface for either the successful resolution or the unsuccessful resolution.

Returning to FIG. 2, in cases where the user was unable to resolve the problem or error, then the selection of additional assistance can be received by the automated support system UI component (Block 213). The automated support system UI component can then generate and send a request for additional assistance to the automated support system backend (Block 215). The request for additional assistance can include any of the collected error information, additional user feedback, and similar information. In some embodiments, at this point a HAR or similar information is collected from the service by the automated support system UI component.

Continuing with FIG. 3, the automated support service backend receives the request from the automated support service UI component including any information about the error provided with the request (Block 313). In some embodiments, the automated support system backend collects the HAR file or similar operational records from the service or from the request. In further embodiments, the HAR file is retrieved from the logging system based on service identifiers, user identifiers, tracking identifiers, or similar information to identify the instance of the service for which log information such as a HAR file is requested (Block 315). At this point or at any point prior where the automated support system back end has been engaged, an initial notification or update notification about the state of the error resolution and supporting error information can be sent to the support team using any messaging system or protocol (Block 317).

Figure 6:
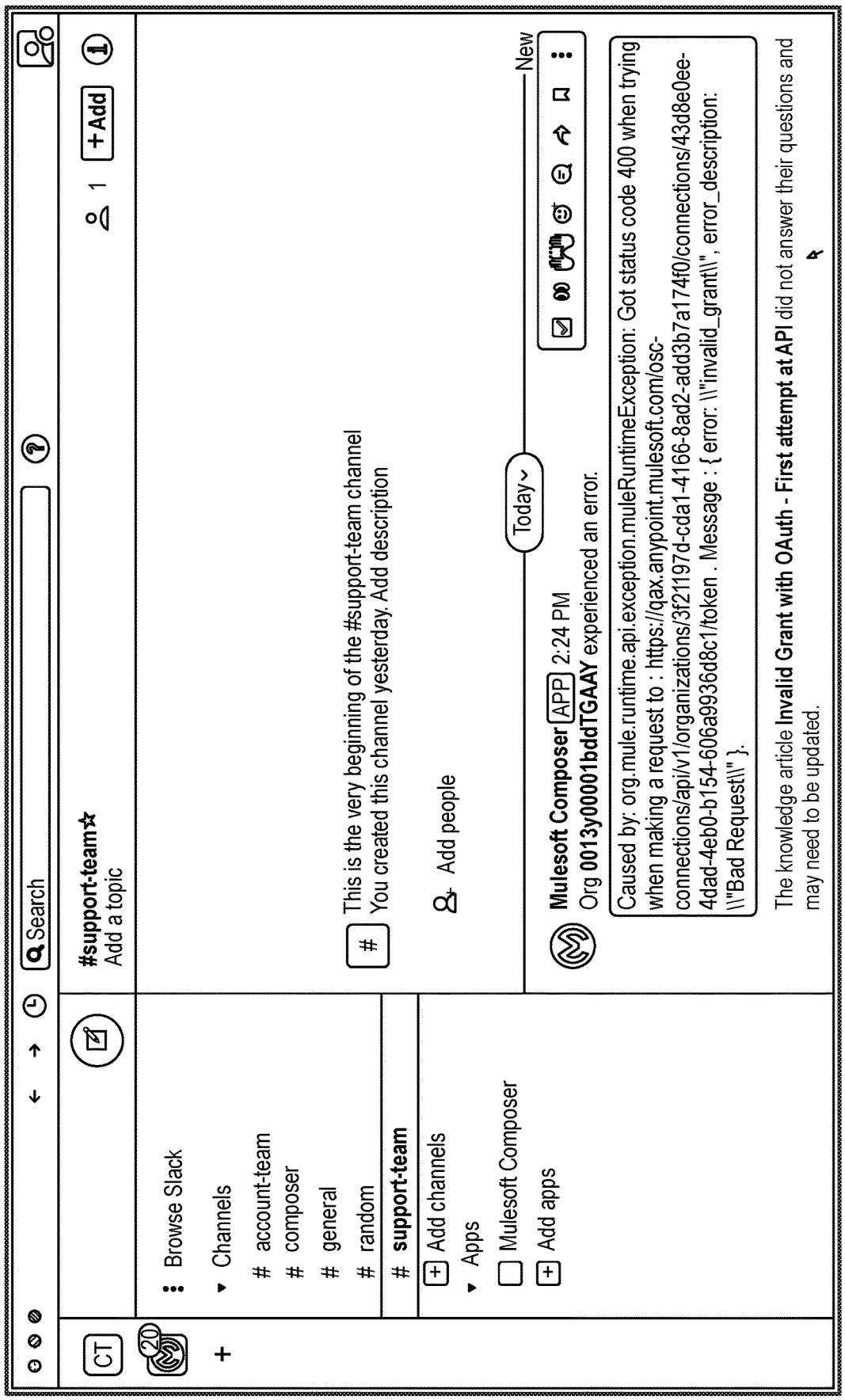
FIG. 6 is a diagram of one embodiment of a support team notification interface.

FIG. 6 is a diagram of one embodiment of a support team notification interface. In this example, a message is generated and sent in a support team channel of a messaging service (e.g., in the Slack application). Details of the error are provided along with an identification of the knowledge base articles reviewed that did not enable the user to resolve the issue or error. Messages or updates to the messages can be generated at any point in the process to provide a running update to the support team.

In FIG. 3, in some embodiments, after the notification is sent to the support team or an update provided to the support team, the automated support service backend can generate a support ticket interface (Block 319). In other embodiments, the notification is not generated, generated at another time, or generated in parallel. The support ticket interface can be configured to be specific to the service by an administrator or the support team. The support ticket interface is pre-populated with the collected error information and the collected HAR file can be attached (Block 321). The collected error information can be matched with fields of the support ticket interface based on a mapping file for the support ticket interface, service, or similar mechanism. The automated support service backend can attempt to input data to each of the fields of the support ticket interface using the collected error information. Once each of the fields has been traversed to find relevant data, the support ticket interface can be sent to the automated support service UI component to be displayed to the user.

In FIG. 2, the automated support service UI component receives the support ticket interface and displays it along with the pre-populated error information to the user via the UI of the service (Block 217). The received support ticket interface is then displayed to the user by the service UI and/or the automated support service UI component (Block 219). The support ticket interface can be a form or similar interface in which each field is labeled and pre-populated information from the collected error information is provided. The user can then input additional information into unfilled fields, update, or correct populated fields, or similarly provide additional error information (Block 221). When the user has completed updating and reviewing the support ticket interface, then the user can input a submission request or similarly interact with the support ticket interface to request a submission to the support team (Block 223). The automated support service UI component can then forward the collected error information, completed support service ticket, and similar information to the automated support service backend. The submitted information can include the pre-populated information and further attachments such as a HAR file.

Figure 7:
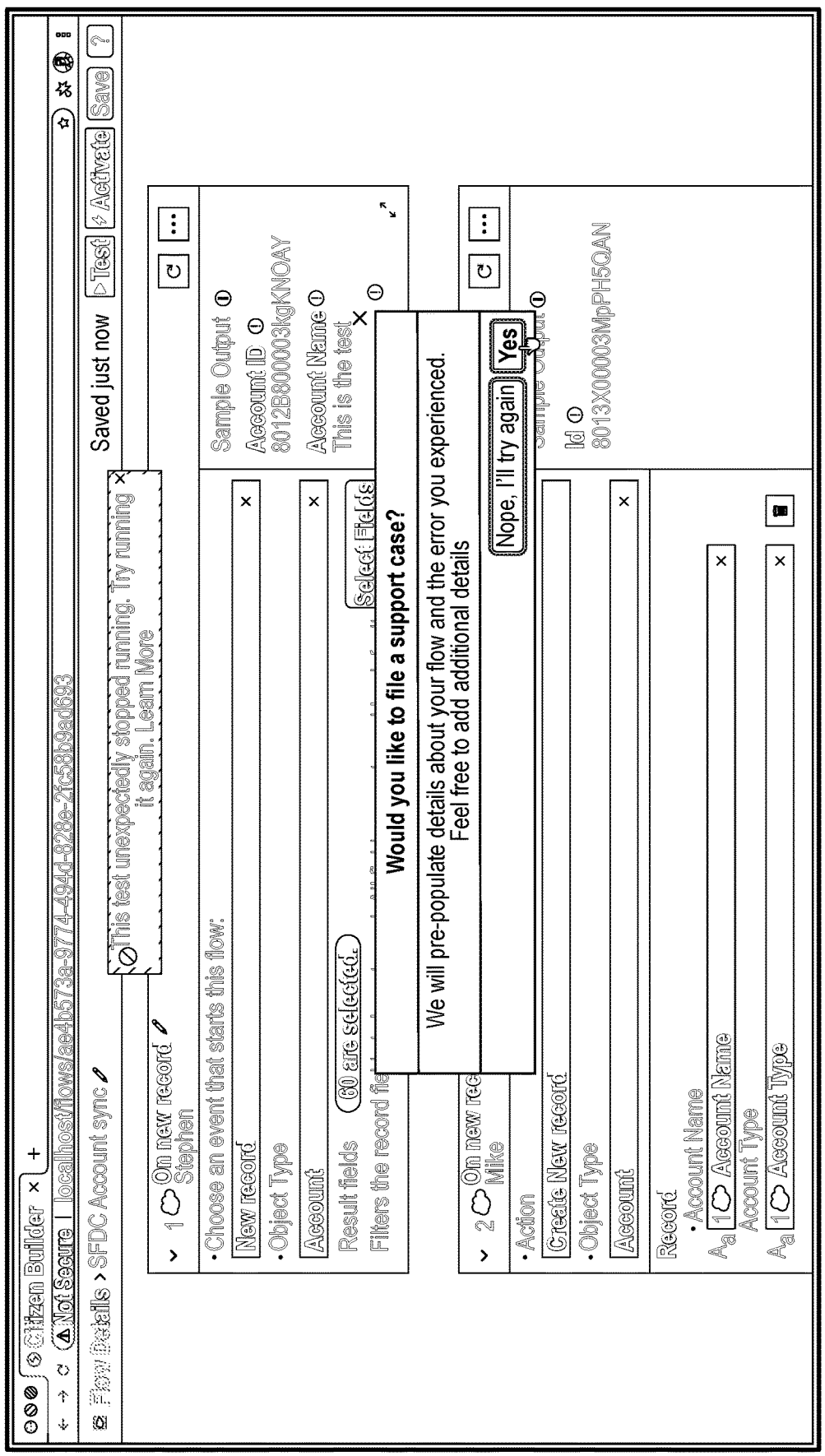
FIG. 7 is a diagram of one embodiment of a ticket initiation interface for a user.

FIG. 7 is a diagram of one embodiment of a ticket initiation interface for a user. The user can be shown this interface to confirm that a ticket submission is requested in response to the request for additional information. If the user requests to submit a support ticket, then this request can result in the receiving and display of the example interface of FIG. 8.

Figure 8:
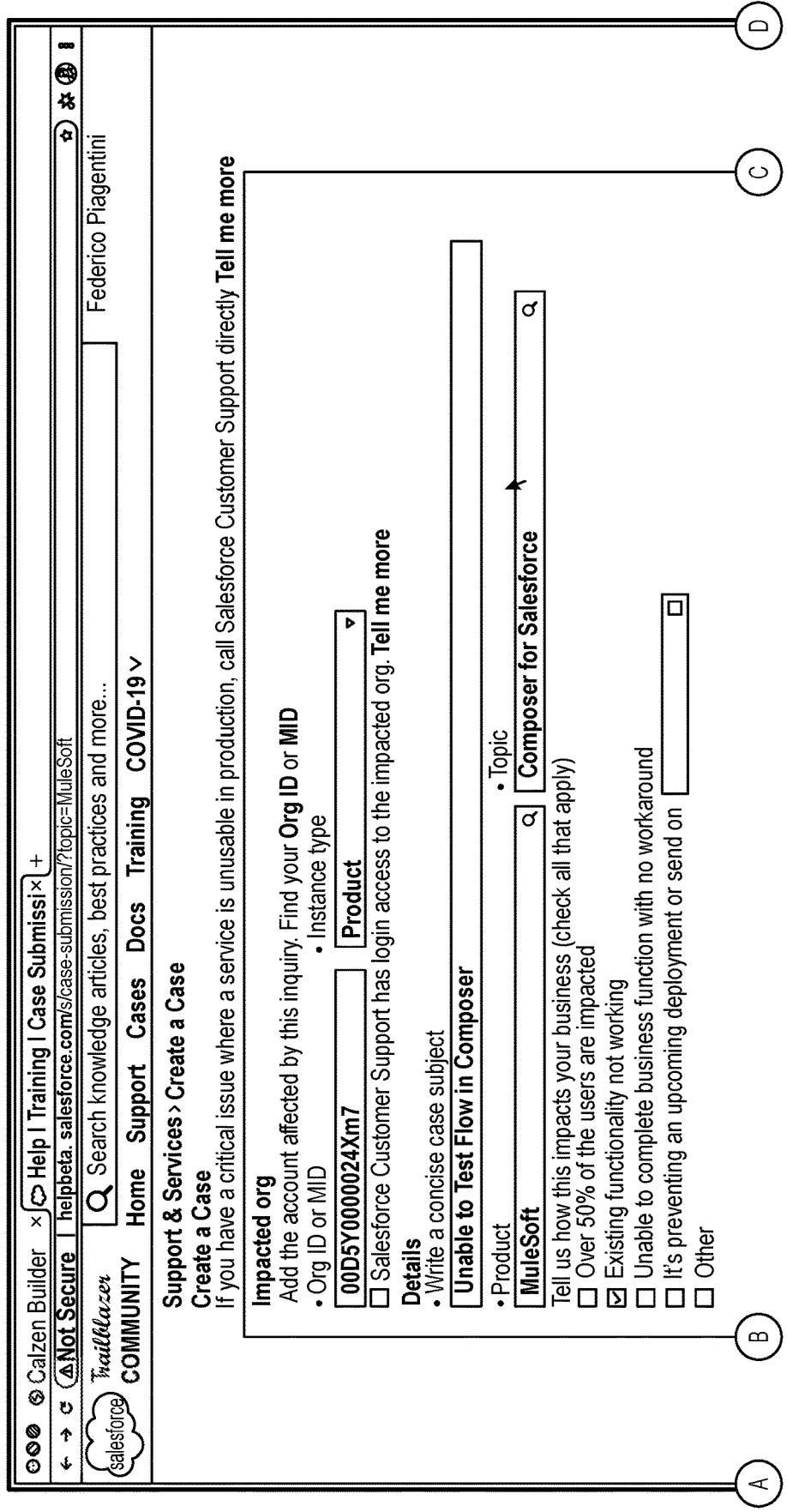
FIG. 8 is a diagram of one embodiment of a ticket creation interface for a user.
Figure 8:
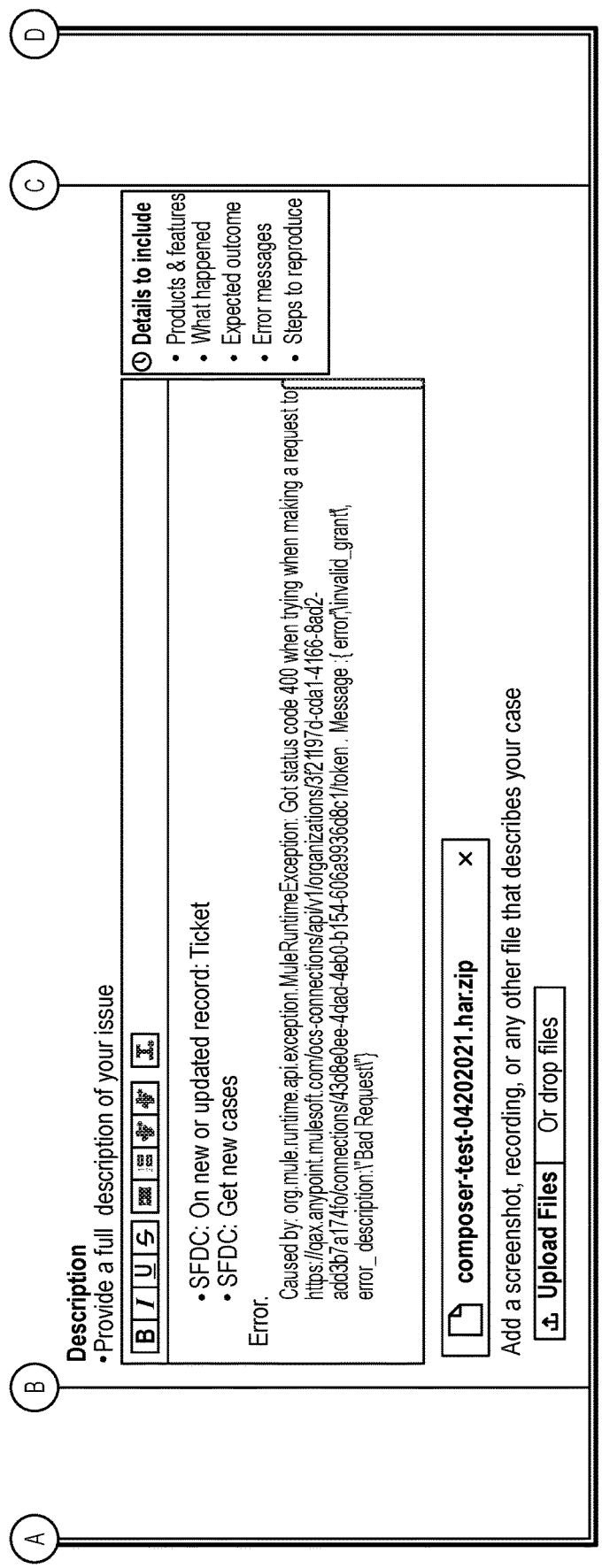

FIG. 8 is a diagram of one embodiment of a ticket creation interface for a user. The example support ticket interface provides a number of fields that each labeled. The input areas such as text boxes, or similar user interface mechanisms, can be populated where the automated support service performs the primary task of pre-populating the fields. In the example, most of the user interface elements, text boxes, check boxes, drop downs, and similar user interface mechanisms have been set based on collected error information. The user can review, correct, and add to the error information. Once complete the user can submit the support ticket to the automated support service backend.

In FIG. 3, the automated support service receives the submitted support ticket (Block 325). The automated support service can analyze the received support ticket to determine the best support team or sub-group thereof to route or queue the support ticket to in the support ticket system. The submitted support ticket can then be forwarded to the support team with the pre-populated error information, additional collected information from the user, a HAR file, or similar logging information, and further error information (Block 327).

The elements of the flowcharts shown in FIGS. 2 and 3 are provided by way of example and not limitation. The steps of these flowcharts are shown to proceed in an example order. However, one skilled in the art would appreciate that these steps can be performed in different order or that some steps can be performed in parallel or can be omitted in some embodiments.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 9A:
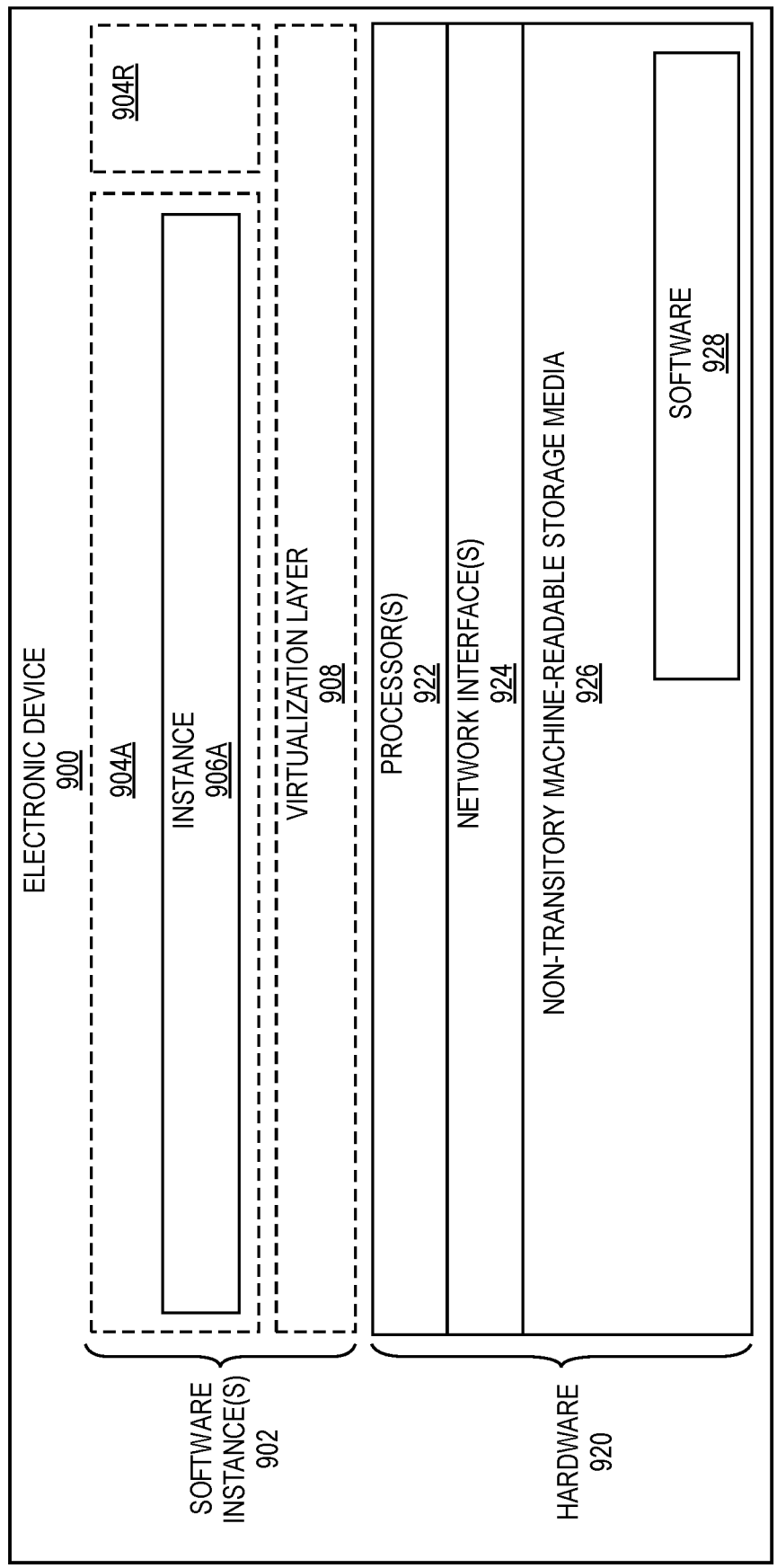
FIG. 9A is a block diagram illustrating an electronic device according to some example implementations.

FIG. 9A is a block diagram illustrating an electronic device 900 according to some example implementations. FIG. 9A includes hardware 920 comprising a set of one or more processor(s) 922, a set of one or more network interfaces 924 (wireless and/or wired), and machine-readable media 926 having stored therein software 928 (which includes instructions executable by the set of one or more processor(s) 922). The machine-readable media 926 may include non-transitory and/or transitory machine-readable media. Each of the previously described clients and the automated support service may be implemented in one or more electronic devices 900. In one implementation: 1) each of the clients is implemented in a separate one of the electronic devices 900 (e.g., in end user devices where the software 928 represents the software to implement clients to interface directly and/or indirectly with the automated support service (e.g., software 928 represents a web browser, a native client, a portal, a command-line interface, and/or an application programming interface (API) based upon protocols such as Simple Object Access Protocol (SOAP), Representational State Transfer (REST), etc.)); 2) the automated support service is implemented in a separate set of one or more of the electronic devices 900 (e.g., a set of one or more server devices where the software 928 represents the software to implement the automated support service); and 3) in operation, the electronic devices implementing the clients and the automated support service would be communicatively coupled (e.g., by a network) and would establish between them (or through one or more other layers and/or or other services) connections for submitting requests and support tickets to the automated support service and returning feedback such as knowledge base articles to the clients. Other configurations of electronic devices may be used in other implementations (e.g., an implementation in which the client and the automated support service are implemented on a single one of electronic device 900).

During operation, an instance of the software 928 (illustrated as instance 906 and referred to as a software instance; and in the more specific case of an application, as an application instance) is executed. In electronic devices that use compute virtualization, the set of one or more processor(s) 922 typically execute software to instantiate a virtualization layer 908 and one or more software container(s) 904A-904R (e.g., with operating system-level virtualization, the virtualization layer 908 may represent a container engine (such as Docker Engine by Docker, Inc. or rkt in Container Linux by Red Hat, Inc.) running on top of (or integrated into) an operating system, and it allows for the creation of multiple software containers 904A-904R (representing separate user space instances and also called virtualization engines, virtual private servers, or jails) that may each be used to execute a set of one or more applications; with full virtualization, the virtualization layer 908 represents a hypervisor (sometimes referred to as a virtual machine monitor (VMM)) or a hypervisor executing on top of a host operating system, and the software containers 904A-904R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 928 is executed within the software container 904A on the virtualization layer 908. In electronic devices where compute virtualization is not used, the instance 906 on top of a host operating system is executed on the "bare metal" electronic device 900. The instantiation of the instance 906, as well as the virtualization layer 908 and software containers 904A-904R if implemented, are collectively referred to as software instance(s) 902.

Alternative implementations of an electronic device may have numerous variations from that described above. For example, customized hardware and/or accelerators might also be used in an electronic device.

Example Environment

Figure 9B:
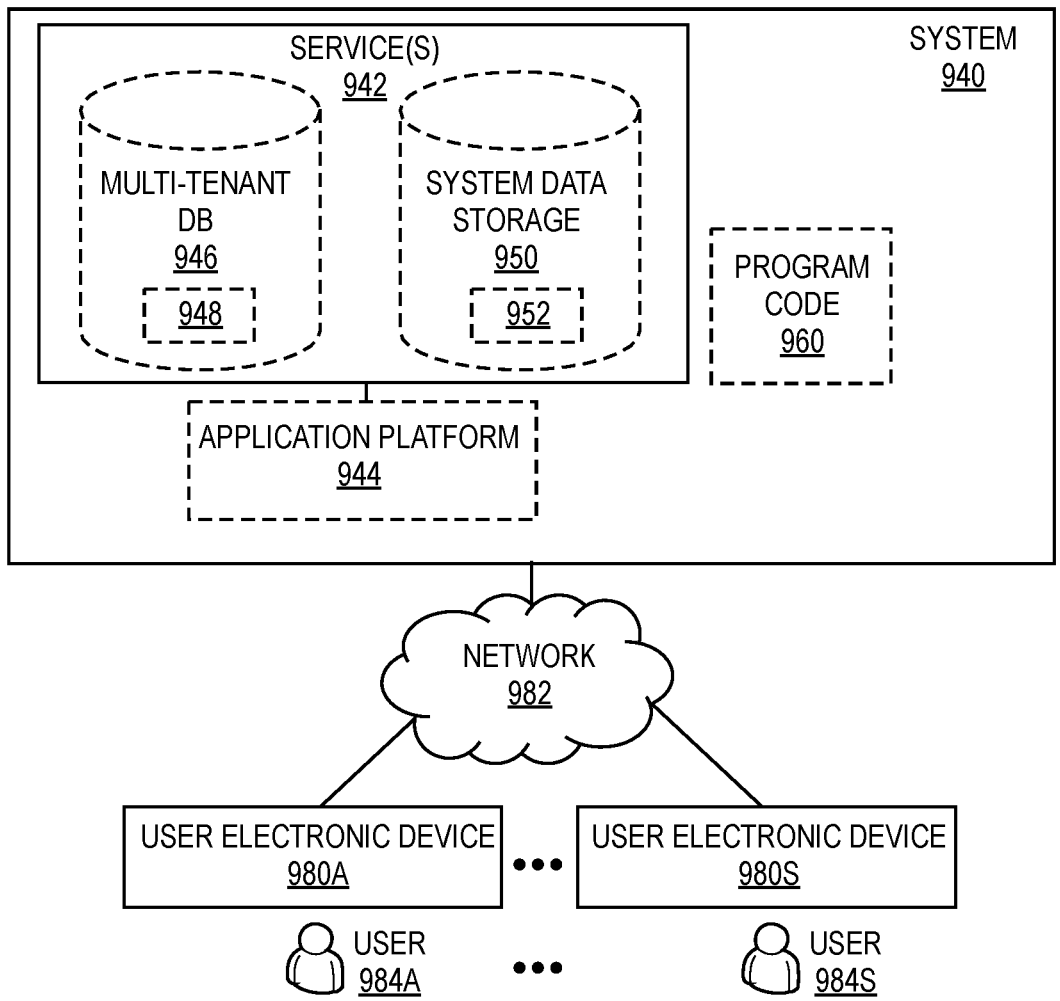
FIG. 9B is a block diagram of a deployment environment according to some example implementations.

FIG. 9B is a block diagram of a deployment environment according to some example implementations. A system 940 includes hardware (e.g., a set of one or more server devices) and software to provide service(s) 942, including the automated support service. In some implementations the system 940 is in one or more datacenter(s). These datacenter(s) may be: 1) first party datacenter(s), which are datacenter(s) owned and/or operated by the same entity that provides and/or operates some or all of the software that provides the service(s) 942; and/or 2) third-party datacenter(s), which are datacenter(s) owned and/or operated by one or more different entities than the entity that provides the service(s) 942 (e.g., the different entities may host some or all of the software provided and/or operated by the entity that provides the service(s) 942). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 940 is coupled to user devices 980A-980S over a network 982. The service(s) 942 may be on-demand services that are made available to one or more of the users 984A-984S working for one or more entities other than the entity which owns and/or operates the on-demand services (those users sometimes referred to as outside users) so that those entities need not be concerned with building and/or maintaining a system, but instead may make use of the service(s) 942 when needed (e.g., when needed by the users 984A-984S). The service(s) 942 may communicate with each other and/or with one or more of the user devices 980A-980S via one or more APIs (e.g., a REST API). In some implementations, the user devices 980A-980S are operated by users 984A-984S, and each may be operated as a client device and/or a server device. In some implementations, one or more of the user devices 980A-980S are separate ones of the electronic device 900 or include one or more features of the electronic device 900.

In some implementations, the system 940 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 940 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 940 may include an application platform 944 that enables PAAS for creating, managing, and executing one or more applications developed by the provider of the application platform 944, users accessing the system 940 via one or more of user devices 980A-980S, or third-party application developers accessing the system 940 via one or more of user devices 980A-980S.

In some implementations, one or more of the service(s) 942 may use one or more multi-tenant databases 946, as well as system data storage 950 for system data 952 accessible to system 940. In certain implementations, the system 940 includes a set of one or more servers that are running on server electronic devices and that are configured to handle requests for any authorized user associated with any tenant (there is no server affinity for a user and/or tenant to a specific server). The user devices 980A-980S communicate with the server(s) of system 940 to request and update tenant-level data and system-level data hosted by system 940, and in response the system 940 (e.g., one or more servers in system 940) automatically may generate one or more Structured Query Language (SQL) statements (e.g., one or more SQL queries) that are designed to access the desired information from the multi-tenant database(s) 946 and/or system data storage 950.

In some implementations, the service(s) 942 are implemented using virtual applications dynamically created at run time responsive to queries from the user devices 980A-980S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 960 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 944 includes an application setup mechanism that supports application developers' creation and management of applications, which may be saved as metadata by save routines. Invocations to such applications, including the automated support service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 982 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 940 and the user devices 980A-980S.

Each user device 980A-980S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 940. For example, the user interface device can be used to access data and applications hosted by system 940, and to perform searches on stored data, and otherwise allow one or more of users 984A-984S to interact with various GUI pages that may be presented to the one or more of users 984A-984S. User devices 980A-980S might communicate with system 940 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 980A-980S might include an HTTP client, commonly referred to as a "browser," for sending and receiving HTTP messages to and from server(s) of system 940, thus allowing users 984A-984S of the user devices 980A-980S to access, process and view information, pages and applications available to it from system 940 over network 982.

Conclusion

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method of an automatic support service, the method comprising:
   receiving, from a user interface component for the automatic support service, a request for additional assistance for an error from a user interface of a second service, wherein the user interface component, which is integrated with the second service, detected the error in the user interface, displayed a notice that offers to obtain additional information about the error to a user, received from the user a request for the additional information, and requested from the automatic support service the additional information;
   retrieving error information from a logging system for the error;
   automatically generating a form to be used to submit a support ticket, wherein at least part of the form is pre-populated based on the retrieved error information;
   sending the form to be displayed to the user interface for completion; and
   responsive to receiving the completed form from the user interface, submitting a support ticket based on the completed form.

2. The method of claim 1, further comprising:
   retrieving an error file from the logging system; and
   forwarding the completed form and the error file to a support team.

3. The method of claim 2, wherein the error file is a hypertext transfer protocol (HTTP) archive (HAR) file.

4. The method of claim 1, further comprising:
   retrieving an error identifier for the error from the logging system;
   retrieving knowledge base articles for the error identifier; and
   sending the knowledge base articles to the user interface.

5. The method of claim 1, wherein the user interface component for the automatic support service implements aspects of the method, further comprising:
   receiving a request for additional assistance from a user;
   sending the request for additional assistance to the automatic support service;
   receiving the form from the automatic support service, the form being pre-populated with the error information from the logging system; and
   displaying the form with the pre-populated error information to the user.

6. The method of claim 5, further comprising:
   collecting additional error information from the user;
   receiving a request from the user to submit the form to the automatic support service; and
   sending the additional error information and pre-populated error information, as part of the completed form, to the automatic support service.

7. The method of claim 6, further comprising:
   displaying the additional information as part of a second notice that offers to obtain additional assistance, and
   transmitting, to the automatic support service, the request for additional assistance.

8. A non-transitory machine-readable storage medium, having instructions stored therein, which when executed by a computer processor cause the processor to perform a set of operations of a method of an automatic support service, the set of operations comprising:
   receiving, from a user interface component for the automatic support service, a request for additional assistance for an error from a user interface of a second service, wherein the user interface component, which is integrated with the second service, detected the error in the user interface, displayed a notice that offers to obtain additional information about the error to a user, received from the user a request for the additional information, and requested from the automatic support service the additional information;
   retrieving error information from a logging system for the error;
   automatically generating a form to be used to submit a support ticket, wherein at least part of the form is pre-populated based on the retrieved error information;
   sending the form to be displayed to the user interface for completion; and
   responsive to receiving the completed form from the user interface, submitting a support ticket based on the completed form.

9. The non-transitory machine-readable storage medium of claim 8, the set of operations further comprising:

retrieving an error file from the logging system; and forwarding the completed form and the error file to a support team.

10. The non-transitory machine-readable storage medium of claim 9, wherein the error file is a hypertext transfer protocol (HTTP) archive (HAR) file.

11. The non-transitory machine-readable storage medium of claim 8, the set of operations further comprising:

retrieving an error identifier for the error from the logging system;

retrieving knowledge base articles for the error identifier; and sending the knowledge base articles to the user interface.

12. The non-transitory machine-readable storage medium of claim 8, the set of operations further comprising:

receiving a request for additional assistance from a user;

sending the request for additional assistance to the automatic support service;

receiving the form from the automatic support service, the form being pre-populated with the error information from the logging system; and displaying the form with the pre-populated error information to the user.

13. The non-transitory machine-readable storage medium of claim 12, the set of operations further comprising:

collecting additional error information from the user;

receiving a request from the user to submit the form to the automatic support service; and sending the additional error information and pre-populated error information, as part of the completed form, to the automatic support service.

14. The non-transitory machine-readable storage medium of claim 13, the set of operations further comprising:

displaying the additional information as part of a second notice that offers to obtain additional assistance, and transmitting, to the automatic support service, the request for additional assistance.

15. An apparatus comprising:

a non-transitory machine-readable storage medium that stores software; and a set of one or more processors, coupled to the non-transitory machine-readable storage medium, to execute the software that implements an automatic support service and that is configurable to:

receive, from a user interface component for the automatic support service, a request for additional assistance for an error from a user interface of a second service, wherein the user interface component, which is integrated with the second service, detected the error in the user interface, displayed a notice that offers to obtain additional information about the error to a user, received from the user a request for the additional information, and requested from the automatic support service the additional information;

retrieve error information from a logging system for the error;

automatically generate a form to be used to submit a support ticket, wherein at least part of the form is pre-populated based on the retrieved error information;

send the form to be displayed to the user interface for completion; and responsive to receiving the completed form from the user interface, submit a support ticket based on the completed form.

16. The apparatus of claim 15, wherein the automatic support service is further configurable to:

retrieve an error file from the logging system; and forward the completed form and the error file to a support team.

17. The apparatus of claim 16, wherein the error file is a hypertext transfer protocol (HTTP) archive (HAR) file.

18. The apparatus of claim 15, wherein the automatic support service is further configurable to:

retrieve an error identifier for the error from the logging system;

retrieve knowledge base articles for the error identifier; and send the knowledge base articles to the user interface.

19. The apparatus of claim 15, wherein the user interface component for the automatic support service implements further aspects of the software, the user interface component configurable to:

receive a request for additional assistance from a user;

send the request for additional assistance to the automatic support service;

receive the form from the automatic support service, the form being pre-populated with the error information from the logging system; and display the form with the pre-populated error information to the user.

20. The apparatus of claim 19, wherein the user interface component for the automatic support service is further configurable to:

collect additional error information from the user;

receive a request from the user to submit the form to the automatic support service; and send the additional error information and pre-populated error information, as part of the completed form, to the automatic support service.

21. The apparatus of claim 20, wherein the user interface component for the automatic support service is further configurable to:

displaying the additional information as part of a second notice that offers to obtain additional assistance, and transmitting, to the automatic support service, the request for additional assistance.

* * * * *